(12) United States Patent
Godwood et al.

(10) Patent No.: US 8,261,344 B2
(45) Date of Patent: Sep. 4, 2012

(54) METHOD AND SYSTEM FOR CLASSIFICATION OF SOFTWARE USING CHARACTERISTICS AND COMBINATIONS OF SUCH CHARACTERISTICS

(75) Inventors: Ben Godwood, Finstock (GB); William James McCourt, Abingdon (GB)

(73) Assignee: Sophos PLC, Abingdon (GB)

( * ) Notice: Subject to any disclaimer, the term of this patent is extended or adjusted under 35 U.S.C. 154(b) by 1115 days.

(21) Appl. No.: 11/428,203

(22) Filed: Jun. 30, 2006

(65) Prior Publication Data
US 2008/0005796 A1 Jan. 3, 2008

(51) Int. Cl.
G06F 11/00 (2006.01)
G06F 12/14 (2006.01)
G06F 12/16 (2006.01)
G08B 23/00 (2006.01)
G06F 11/30 (2006.01)
G06F 9/44 (2006.01)

(52) U.S. Cl. ........... 726/22; 726/24; 713/188; 717/126; 717/127; 717/131

(58) Field of Classification Search .............. 726/22–25; 713/188; 717/126, 127, 131
See application file for complete search history.

(56) References Cited

U.S. PATENT DOCUMENTS

| | | | | |
|---|---|---|---|---|
| 5,826,013 A * | 10/1998 | Nachenberg | .................... | 726/22 |
| 6,301,699 B1 * | 10/2001 | Hollander et al. | ............ | 717/131 |
| 6,357,008 B1 * | 3/2002 | Nachenberg | .................... | 726/24 |
| 7,013,483 B2 * | 3/2006 | Cohen et al. | .................... | 726/25 |
| 7,069,583 B2 * | 6/2006 | Yann et al. | ........................ | 726/4 |
| 7,080,355 B2 * | 7/2006 | Carlson et al. | ................ | 717/120 |
| 7,398,553 B1 | 7/2008 | Li | | |
| 7,496,963 B2 * | 2/2009 | Shipp | .............................. | 726/24 |
| 7,519,997 B2 * | 4/2009 | Shipp | .............................. | 726/24 |
| 7,636,856 B2 * | 12/2009 | Gheorghescu et al. | ........ | 713/188 |
| 7,636,945 B2 * | 12/2009 | Chandnani et al. | ............. | 726/24 |
| 7,640,587 B2 * | 12/2009 | Fox et al. | ........................ | 726/24 |
| 7,725,735 B2 * | 5/2010 | Fox et al. | ....................... | 713/188 |
| 7,814,544 B1 * | 10/2010 | Wilhelm | ......................... | 726/22 |
| 8,069,435 B1 | 11/2011 | Lai | | |
| 8,108,315 B2 | 1/2012 | Krawetz | | |
| 8,161,548 B1 * | 4/2012 | Wan | ............................... | 726/22 |

(Continued)

FOREIGN PATENT DOCUMENTS
WO    WO2006006144    1/2006

OTHER PUBLICATIONS
"Search Report Uncer Section 17(5)", for Application No. GB0711866.4, mailed Oct. 12, 2007.

(Continued)

*Primary Examiner* — Christian Laforgia
(74) *Attorney, Agent, or Firm* — Strategic Patents, P.C.

(57) ABSTRACT

Certain embodiments of the present invention provide methods and systems for software classification. Certain embodiments provide a method for identification of malware. Certain embodiments provide a method for identification of unwanted software. The method includes identifying one or more functional blocks and/or properties of software. The method further includes identifying genes in the functional blocks and/or properties. The method also includes matching the resulting list of genes against one or more combinations of classifications of groupings of genes. Additionally, the method includes classifying the software. Certain embodiments provide a method for generating classifications. The method includes identifying functional blocks and/or properties. Furthermore, the method includes combining a plurality of genes to form a classification.

21 Claims, 3 Drawing Sheets

U.S. PATENT DOCUMENTS

| | | | |
|---|---|---|---|
| 2003/0110385 A1* | 6/2003 | Golobrodsky et al. | 713/188 |
| 2004/0181677 A1 | 9/2004 | Hong et al. | |
| 2005/0044197 A1 | 2/2005 | Lai | |
| 2005/0172338 A1 | 8/2005 | Sandu et al. | |
| 2005/0187740 A1* | 8/2005 | Marinescu | 703/1 |
| 2006/0015940 A1* | 1/2006 | Zamir et al. | 726/22 |
| 2006/0123244 A1* | 6/2006 | Gheorghescu et al. | 713/188 |
| 2006/0123480 A1* | 6/2006 | Oh et al. | 726/23 |
| 2007/0016953 A1* | 1/2007 | Morris et al. | 726/24 |
| 2007/0033659 A1 | 2/2007 | Hoche et al. | |
| 2007/0239993 A1* | 10/2007 | Sokolsky et al. | 713/188 |
| 2007/0240212 A1* | 10/2007 | Matalytski | 726/22 |
| 2008/0010538 A1* | 1/2008 | Satish et al. | 714/38 |
| 2008/0040710 A1* | 2/2008 | Chiriac | 717/136 |
| 2009/0019426 A1 | 1/2009 | Baeumer et al. | |
| 2009/0187992 A1* | 7/2009 | Poston | 726/24 |
| 2009/0328011 A1 | 12/2009 | Lifliand et al. | |

OTHER PUBLICATIONS

"Intellectual Property Office-PGB Search Report", Sep. 27, 2010, all.

Skormin, et al., ""In the Search of the "Gene of Replication" in Malicious Codes"", *Proceedings from the Sixth Annual IEEE Systems, Man and Cybernetics Information Assurance Workshop* 2005, 193-200.

Dig, Danny et al., "Automated Detection of Refactorings in Evolving Components", Springer-Verlag Berlin. Heidelberg. 2006, 404-428.

"U.S. Appl. No. 12/413,823, Non-Final Office Action mailed Mar. 19, 2012",, 19.

* cited by examiner

100

300

METHOD AND SYSTEM FOR CLASSIFICATION OF SOFTWARE USING CHARACTERISTICS AND COMBINATIONS OF SUCH CHARACTERISTICS

BACKGROUND OF THE INVENTION

The present invention generally relates to classification of software, including malware and unwanted software. More particularly, the present invention relates to identification of software based on identification of certain characteristics (hereinafter called "genes") and matching such genes against certain created classifications defined as groupings of genes.

Malware is a general categorization of a computer contaminant including computer viruses, worms, Trojan horses, spyware and/or adware, for example. Unlike defective software which has a legitimate purpose but contains errors, malware is written to infiltrate or damage a computer system and/or other software. Malware may also steal sensitive information, such as passwords. Some malware programs install a key logger, which copies down the user's keystrokes when entering a password, credit card number, or other useful information.

Malware includes viruses and worms, which spread to infect other executable software and/or computers locally and/or over a network, for example. By inserting a copy of itself into the machine code instructions in these executables, a virus causes itself to be run whenever the program is run or the disk is booted.

Additionally, Microsoft Word® and similar programs include flexible macro systems receptive to macro viruses that infect documents and templates, rather than applications, through executable macro code.

Worms, unlike viruses, typically do not insert themselves into other programs but, rather, exploit security holes in network server programs and start themselves running as a separate process. Worms typically scan a network for computers with vulnerable network services, break in to those computers, and replicate themselves.

Another type of malware is a Trojan horse or Trojan. Generally, a Trojan horse is an executable program that conceals a harmful or malicious payload. The payload may take effect immediately and can lead to many undesirable effects, such as deleting all the user's files, or the payload may install further harmful software into the user's system. Trojan horses known as droppers are used to start off a worm outbreak by injecting the worm into users' local networks.

Spyware programs are produced for the purpose of gathering information about computer users.

Additionally, systems may become infected with unwanted software. Unwanted software is defined as being software that is installed or used without the system owner's permission. Although unwanted software is not malicious, it can either affect performance of client machines or potentially introduce security risks and related legal risks into an organization. Such unwanted software may include adware, dialers, remote administration tools and hacking tools.

Traditional malware protection techniques are based around anti-virus vendors creating signatures for known malware and products that scan systems searching for those specific signatures.

With this approach, an identification or definition of malware and/or unwanted software is released once a lab has seen and analyzed a sample of such software. This can mean that some users may be infected before the definitions have been released. Thus, systems and methods providing detection of unknown malware and/or unwanted software to help prevent users from being infected before a definition is released would be highly desirable.

The volume of malware has increased dramatically (around 140+ Brazilian Banking Trojans per day for example). Multiple variants of the same malware threat are relentlessly created and rapidly distributed, with the aim of defeating traditional signature-based virus protection.

Some anti-virus software uses heuristics to attempt to identify unknown viruses. Heuristics techniques look at various properties of a file and not necessarily the functionality of the program. This leads to high false positive rates.

Other behavior based technologies rely on running malware and attempting to stop execution if malicious behavior is observer to happen. By allowing malware to execute, the malware may already have caused damage before it is blocked. Additionally, behavior-based technology often requires extensive user interaction to authorize false positives.

The network security threats faced by enterprises today are much more complex than 20 years ago. The exponential growth in malware is compounded by its speed of propagation and the complexity of blended threats, changing the nature of the risks. The behavior of network users is also changing rapidly. There is a need for systems and methods for proactively classifying software before malware or unwanted software causes damage.

BRIEF SUMMARY OF THE INVENTION

Certain embodiments of the present invention provide methods and systems for software classification.

Certain embodiments provide a method for classifying software including identifying at least one of a functional block and a property of the software. The method further includes identifying one or more genes in the at least one of a functional block and a property of the software. Additionally, the method includes matching the one or more genes against one or more classifications defined from groupings of genes. Furthermore, the method includes classifying the software based on the one or more classifications.

Certain embodiments provide a method for generating classifications defined for groupings of genes, for use in classifying software. The method includes identifying one or more genes that appear in software. The method further includes combining a plurality of genes to classify or form a set of genes. Additionally, the method includes testing the set of genes for false-positives against one or more reference files. The method also includes defining a software classification based on the set of genes.

Certain embodiments provide a computer-readable medium having a set of instructions for execution on a computer. The set of instructions includes an identification routine configured to identify one or more functional blocks and/or properties of software. The set of instructions also includes a routine configured to identify genes in the one or more functional blocks and/or properties. Furthermore, the set of instructions includes a matching routine configured to match genes against a list of known classifications defined as groupings of genes. Additionally, the set of instructions includes a classification routine configured to classify the software.

Figure 1:
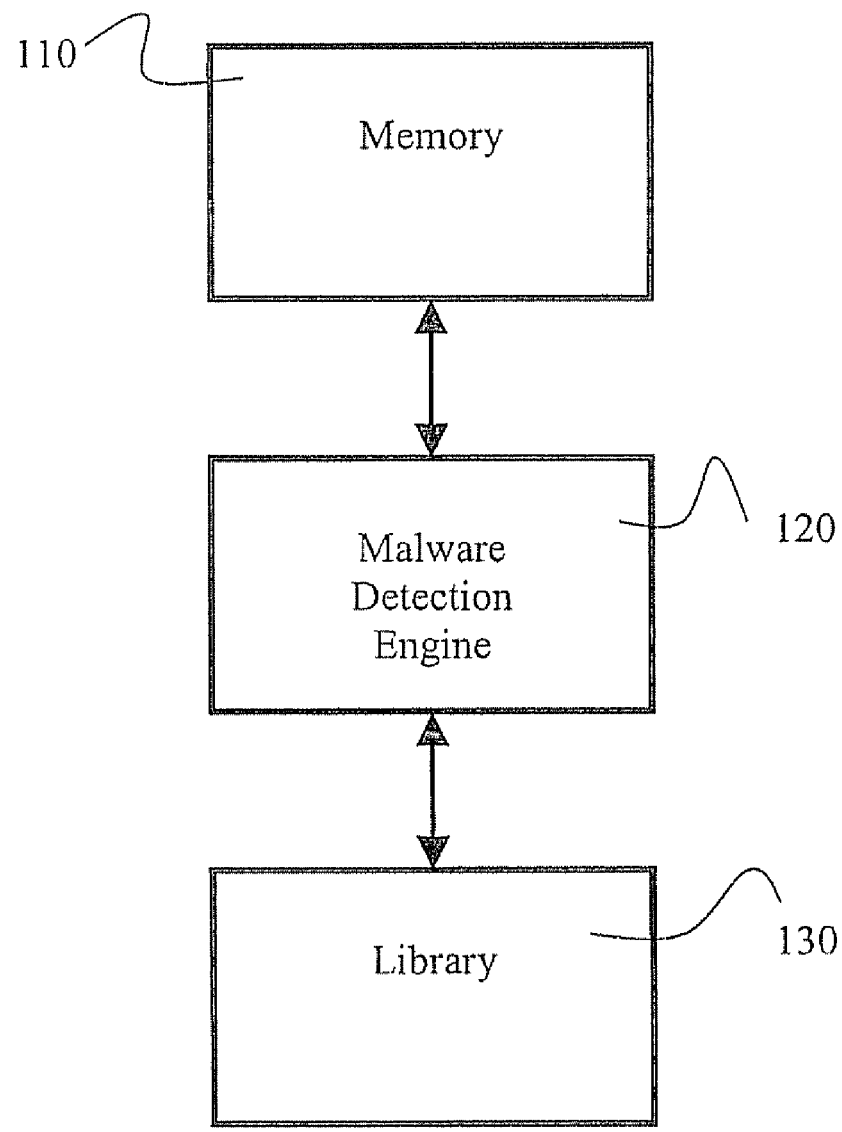
FIG. 1 illustrates a malware detection system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a malware detection system 100 in accordance with an embodiment of the present invention. System 100 includes a memory 110 storing one or more files, a malware detection engine 120, and a library 130. System 100 may also include an interface (not shown) to allow a user to interact with malware detection engine 120 to trigger a malware scan, view status, view results, take action, etc.

Memory 110 may include a hard disk, a floppy disk, an optical disk, a magnetic disk, a tape, a random access memory (RAM), a read-only memory (ROM), a programmable ROM (PROM, EPROM, EEPROM), CD, DVD, flash memory, cache, buffer, register, and/or other temporary or persistent data storage. File(s) to be scanned may be temporarily and/or persistently stored in memory 110. Memory 110 may be normal computer system memory and/or special purpose memory for use in malware detection.

Library 130 includes one or more of saved checksums, malware patterns, virus and/or other malware definitions, gene information, information as classifications based on groupings of genes, etc. Library 130 is accessed by malware engine 120 to detect/classify malware in a file.

Components of system 100 may be implemented in software, hardware and/or firmware, for example. The components of system 100 may be implemented separately and/or implemented in a variety of combinations. For example, library 130 may be incorporate in malware engine 120. Components of system 100 may be implemented on a single computer system for processing software and messages. Alternatively, components of system 100 may be implemented in a distributed network where different processes occur on different machines with a communication network to allow sharing of information. System 100 may be implemented using one or more software programs.

In certain embodiments, system 100 provides both immediate and scheduled malware scanning and disinfection. Malware may be detected in a variety of ways, such as by comparing checksum of a file to a stored checksum value, pattern matching to identify known malware patterns in files, electronic mail and/or disk areas (e.g., boot sectors), emulating all or part of a file's code to try and detect malware, such as polymorphic viruses, which may reveal themselves during execution, and/or extracting and analyzing functionality from a file by matching genes and/or classifications defined from groupings of genes, e.g., PHENOTYPE™ classifications (PHENOTYPE™ is a trademark of the assignee of the present patent application). After detection, a user and/or system may be notified of detected malware, and system 100 may automatically and/or upon request attempt to disinfect, quarantine or remove detected malware or malware fragments from the file/email/disk area.

Pattern matching and other forms of detection may be performed using Virus Identity Files (IDEs) or other identity files that contain algorithms describing various characteristics of a virus and/or other malware for use in malware recognition.

Malware engine 120 loads and searches data from the input file. Malware engine 120 may use pattern matching, for example, to compare sequences of code in the file to known virus code sequences identify a particular sequence of code that is similar or identical to a virus code. Malware engine 120 may also combine pattern matching with heuristics to use general, rather than specific, rules to detect several viruses in the same family, for example. Malware engine 120 may also include a code emulator for detecting polymorphic viruses (self-modifying viruses) and/or an on-line decompressor for scanning inside archive files. Malware engine 120 may also include an OLE2 (object linking and embedding) engine for detecting and disinfecting macro viruses.

In certain embodiments, malware engine 120 receives an input file and returns a result. Virus IDE and product updates may be downloaded to account for new viruses and/or other malware, for example.

In certain embodiments, malware engine 120 may be used to scan files "on-demand." A user may identify files or groups of files to scan immediately.

On-demand scanning may also be scheduled by a user. For example, the user specifies a time at which to scan a selected group of files. At the scheduled time, malware engine 120 scans the selected files that are already stored, for example, in memory 110. A user or users may establish multiple schedules for malware scanning. Different configurations may be set for each scheduled scan. Alternatively and/or in addition, certain embodiments provide on-access malware detection using malware engine 120.

In certain embodiments, malware engine 120 intercepts open file or file close or file access requests, for example, by a user, an operating system, an application, etc.

In certain embodiments, a user may specify which files to check via a scheduled and/or on-access scan. That is, a user can include and/or exclude certain types of files from malware scanning. Additionally, the user may configure system 100 to check files on read, on write, and/or on rename, for example. The user may also configure system 100 to block access to the file, or to automatically initiate disinfection, removal and/or quarantine of a file upon finding malware in the file.

In certain embodiments, system 100 may be used to identify malware by extracting functionality from a file and classifying the functionality. In certain embodiments, malware engine 120 may classify functionality and identify malware without requiring a most up-to-date set of virus and/or other malware definitions. Malware engine 120 may classify a file and/or functionality within a file as malicious, non-malicious, suspicious, etc. based on functionality and/or relationships between or combinations of functionality, for example. Alternatively and/or in addition, malware engine 120 may identify a particular malware program represented by and/or included in the file.

Figure 2:
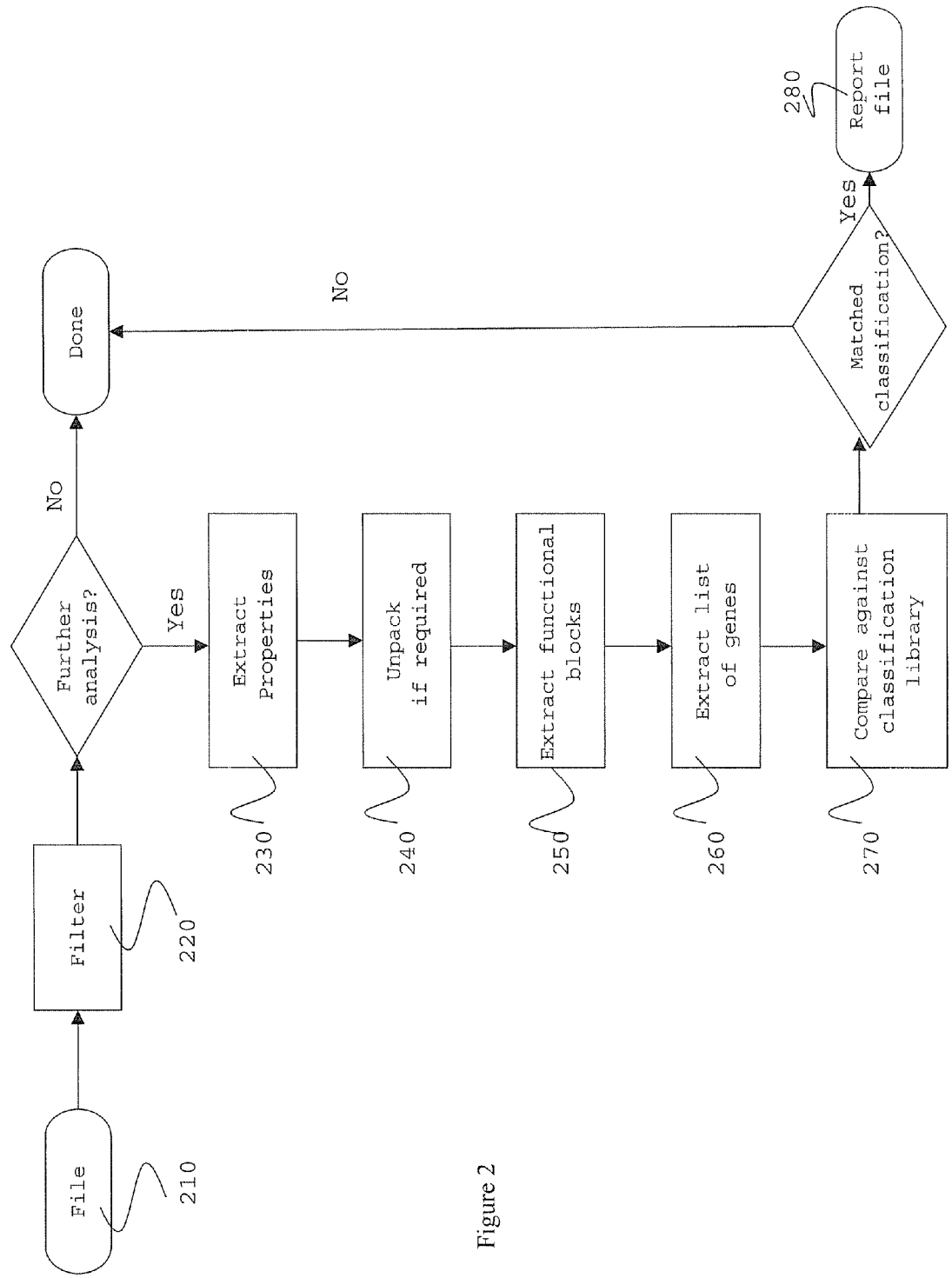
FIG. 2 depicts a flow diagram for a method for software classification in accordance with an embodiment of the present invention.

FIG. 2 depicts a flow diagram for a method 200 for software classification in accordance with an embodiment of the present invention. At step 210, analysis of a computer file or other sample to be checked is commenced. At step 220, the file is filtered. This is a series of quick checks to determine whether a file needs further analysis. For example, one or more files may be screened for efficiency reasons. If a file is packed, for example, a malware detection system may spend more time checking the file. If a file passes a checksum test, for example, the software classification system may not further examine the file.

In certain embodiments, at step 230, properties are extracted from the file. For example the file size or name may be extracted.

In certain embodiments, the file is unpacked if necessary (step 240). For example, malware may be obfuscated using run-time packers, which render static analysis of code difficult. Packing is a process of transforming a program file, using compression and/or encryption, so that its functionality is obfuscated. Unpacking is a method of restoring a packed program file to its unpacked state, so that the functionality is no longer obfuscated. This is done using decompression and/or decryption, for example.

At step 250, the function blocks are extracted from the file. These functional blocks include sequences of application program interface (API) calls, string references, etc., which illustrate the function and execution flow of the program. Functional blocks are extracted from a program file's binary code. While various instances of software may use common code and similar techniques, the resulting compiled bytes can be very different. The same source code can be compiled using different compilers to produce different binary files. The compiled bytes are different but the files are functionally the same. Functional blocks provide a high level view of the functionality of a file regardless of binary compilation.

At step 260, each functional block is searched for genes to build a list of genes present in the file. Different types of functionality (classified as genes, for example) may be extracted from the sequenced blocks. A gene is piece of functionality or property of a program. Each piece of functionality is described using sequences of APIs and strings, which can be matched against functional blocks. A matching functional block includes the APIs and strings in the correct order. The gene and the functional block do not need to match exactly. A functional block may contain more than one gene. Genes are defined using a gene definition language, for example. Each gene describes or identifies a different behavior or characteristic of malware or other file. For example, malware may copy itself to a %SYSTEM% directory. Therefore, a gene may be created to identify this functionality by matching the sequence of API calls and the strings that are referenced.

At step 270, the list of genes is compared against a library of classifications of genes. A classification of gene combination has been detected if all the genes contained in that gene combination are present in the list of genes identified in the file.

A classification of genes represents a certain class of software. A classification of genes is a combination of genes used to describe or identify a class of software program. For example, a classification of genes to match an IRC Bot malware file (an independent program that connects to an Internet Relay Chat (IRC) and performs automated functions) may include the following genes:

| | |
|---|---|
| SockSend | Socket based activity |
| RunKey | Sets a run key |
| Exec | Executes other programs |
| CopySys | Copies itself to the system directory |
| AVList | Contains a list of AV (anti-virus) products |
| IRC | IRC references |
| Host | References the hosts file |

At step 280, an output is generated. For example, the most significant classification may be reported. Alternatively and/or in addition, all identified classifications, genes and/or software classifications may be reported. Reporting may include generating and/or editing a log file, printing an output, emailing an output, generating an audible output, generating a visual output, facsimile transmission of an output, electronic storage of an output, etc. In addition to reporting, an output may include disinfection, deletion, and/or quarantine of the file and/or related files, for example.

For example, the following functional block sequenced from a software program matches three genes ("CopySys", "Runkey" and "Exec"):
GetSystemDirectoryA
GetModuleHandleA
GetModuleFileNameA
"tftpd.exe"
"winhlpp32.exe"
strcat
strcat
"software\microsoft\windows\currentversion\run"
RegCreateKeyExA
strlen
RegSetValueExA
RegCloseKey
CopyFileA
CreateProcessA
The gene "CopySys" copies itself to a system folder and includes the following functions, for example:
GetSystemDirectoryA
GetModuleHandleA
GetModuleFileNameA
".exe"
CopyFileA
The gene "Runkey" sets a run key and includes, as an example, the following functions:
"software\microsoft\windows\currentversion\run"
RegCreateKeyExA
RegSetValueExA
The gene "Exec" executes other programs and includes, as an example, the following functions:
CreateProcessA
The three genes in this example form a classification defined by a group of the three genes, and may be used to classify the software as malicious, suspicious, unwanted, etc.

Figure 3:
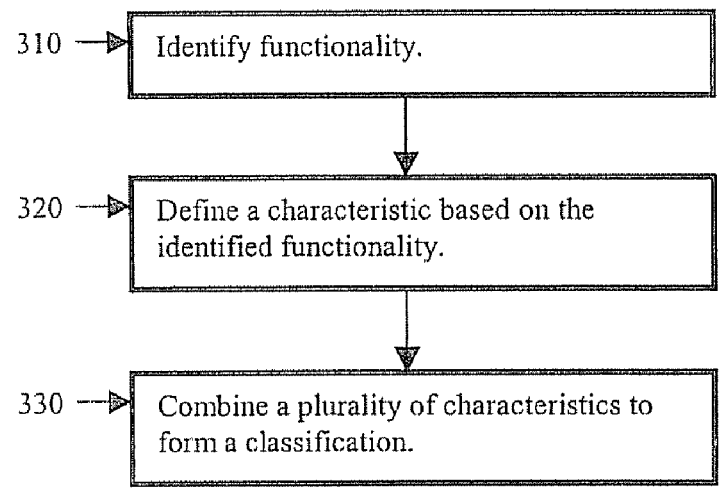
FIG. 3 illustrates a flow diagram for a method for generating genes and groupings of genes for software classification in accordance with an embodiment of the present invention.

FIG. 3 illustrates a flow diagram for a method 300 for generating genes and classifications defined by groupings of genes to be used for malware and/or other software classification in accordance with an embodiment of the present invention. At step 310, software functionality is identified. For example, the functionality for copying code to a system directory is identified. At step 320, a software characteristic is defined based on the identified functionality. For example, the characteristic 'CopySys' from the above example is defined based on the identified copy functionality.

At step 330, a plurality of software characteristics are combined to form a software classification. For example, the characteristics listed in the examples above: 'SockSend, RunKey, Exec, CopySys, AVList, IRC, and Host' are combined to form a classification for an 'IRC Bot' program.

In certain embodiments, functionality is common to both malware and normal programs. Malware may be identified and/or classified based on combinations of such functionality. In certain embodiments, both malware and non-malware programs may be classified according to a variety of genes and/or groupings of genes. For example, unwanted software may be classified according to extracted functionality.

Thus, certain embodiments provide systems and methods to extract functionality of a file to identify malware and/or other types of software programs. Certain embodiments may be used to find functionally similar files, such as by using a "Query by Functionality" search. Certain embodiments detect malware without requiring new patterns to be written for pattern matching detection. Certain embodiments reduce a false positive rate by matching on functionality, rather than heuristics, to describe a type of malware. Certain embodiments allow computers and/or software to be checked for licensing compliance and software updates.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the techniques may be implemented with instructions (e.g., procedures, functions, and so on) that perform the functions described herein. The instructions may be stored in a memory and executed by a processor. The memory may be implemented within the processor or external to the processor.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The invention claimed is:

1. A method for classifying software, said method comprising;
providing a library of gene information including a number of classifications based on groupings of genes;
identifying at least one functional block and at least one property of the software;
identifying one or more genes each describing one or more of the at least one functional block and the at least one property of the software as a sequence of APIs and strings;
matching the one or more genes against one or more of the number of classifications using a processor;
classifying the software based on the matching to provide a classification for the software; and
notifying a user of the classification of the software.

2. The method of claim 1, wherein the classification for the software includes malware.

3. The method of claim 1, wherein the classification for the software includes unwanted software.

4. The method of claim 1, further comprising unpacking the software.

5. The method of claim 1, further comprising disassembling the software.

6. The method of claim 1, further comprising filtering the software.

7. The method of claim 1, further comprising unencrypting the software.

8. The method of claim 1, further comprising generating an output based on the classifying of said software.

9. The method of claim 1, further comprising disinfecting at least one of the software and a computer containing the software when the software is classified as malware.

10. The method of claim 1, further comprising removing the software when the software is classified as malware or unwanted software.

11. The method of claim 1, further comprising quarantining the software when the software is classified as malware or unwanted software.

12. The method of claim 1, further comprising generating reports regarding the software.

13. The method of claims 1, further comprising blocking access to the software when the software is classified as malware or unwanted software.

14. The method of claim 1, further comprising scanning a computer for the software, wherein the scanning includes at least one of a user initiated scanning, a scheduled scanning and an on access scanning.

15. The method of claim 1, wherein the classification is based upon one or more groupings of genes.

16. A method for generating software classifications for use in classifying software, said method comprising:
providing a library of gene information including a number of classifications based on groupings of genes;
identifying one or more genes each describing a functionality or a property of the software as a sequence of APIs and strings;
combining a plurality of genes that describe the software, thereby providing a set of genes;
testing the set of genes for false-positives against one or more reference files using a processor;
defining the software classification based on the set of genes; and
storing the set of genes and the software classification in the library.

17. The method of claim 16, wherein the software classification includes malware.

18. The method of claim 16, wherein the software classification includes unwanted software.

19. The method of claim 16 further comprising returning a result of the software classification to a user.

20. The method of claim 16 further comprising unpacking the software before identifying one or more genes.

21. The method of claim 16 further comprising filtering the software before identifying one or more genes to determine whether the software requires further analysis.

* * * * *